United States Patent [19]

Morrison et al.

[11] Patent Number: 4,853,359
[45] Date of Patent: Aug. 1, 1989

[54] NOVEL TRANSITION METAL DICHALCOGENIDE CATALYSTS

[75] Inventors: S. Roy Morrison, Burnaby; Robert F. Frindt, Vancouver; Per Joensen, Coquitlam; Michael A. Gee, Vancouver; Bijan K. Miremadi, Coquitlam, all of Canada

[73] Assignee: Simon Fraser University, Burnaby, Canada

[21] Appl. No.: 15,920

[22] Filed: Feb. 18, 1987

Related U.S. Application Data

[63] Continuation-in-part of Ser. No. 855,065, Apr. 23, 1986, abandoned.

[51] Int. Cl.⁴ .................... B01J 27/051; B01J 27/049; B01J 27/047; C10G 45/08
[52] U.S. Cl. .................................. 502/220; 208/143; 208/216 R; 252/378 R; 502/216; 502/219; 502/221
[58] Field of Search ............... 502/220, 219, 221, 216; 429/218; 252/378 K

[56] References Cited

U.S. PATENT DOCUMENTS

| | | | |
|---|---|---|---|
| 3,933,688 | 1/1976 | Dines | 423/511 |
| 4,009,052 | 2/1977 | Whittingham | 429/219 |
| 4,224,390 | 9/1980 | Haering et al. | 429/194 |
| 4,299,892 | 11/1981 | Dines et al. | 502/220 |
| 4,322,317 | 3/1982 | Rao et al. | 429/218 |
| 4,323,480 | 4/1982 | Dines et al. | 502/220 |

Primary Examiner—Paul E. Konopka
Attorney, Agent, or Firm—Klarquist, Sparkman, Campbell, Leigh, and Whinston

[57] ABSTRACT

A novel flocculated methanation, hydrogenation or hydrodesulfurization catalyst of the form $MS_2:Y:Z$ wherein $MS_2$ is a single layer transition metal dichalcogenide sulfide, Y is a promoter substance and Z is a support substance, is disclosed.

42 Claims, 3 Drawing Sheets

NOVEL TRANSITION METAL DICHALCOGENIDE CATALYSTS

This application is a continuation-in-part of application Ser. No. 855,065, filed Apr. 23, 1986, now abandoned.

FIELD OF THE INVENTION

This invention is directed to novel catalysts, and more particularly novel flocculated supported single-layered transition metal dichalcogenide catalysts.

BACKGROUND OF THE INVENTION

The preparation of high surface area catalysts for use in oil refining, gasification of coal, or for other reactions requiring catalytic surfaces, has been a developing field for many years. Catalysts are presently prepared in many different ways. Hydrodesulfurization catalysts, for example, are usually prepared by co-impregnating a suitable support (e.g. alumina) with a salt (e.g. ammonium heptamolybdate) and a promoter (e.g. a nickel or cobalt salt) followed by calcination. The catalysts are then sulfided immediately prior to use. There are several drawbacks and limitations to the catalyst preparation processes which are presently employed, one of which is high cost. Also, the number of active sites per gram of catalyst is generally low, thereby resulting in low catalyst activity.

Another method for making catalysts involves the exfoliation of a layered transition metal dichalcogenide (e.g. molybdenum disulfide) containing an alkali metal. Alkali metals can be introduced into transition metal dichalcogenides in a number of ways. For example, lithium can be introduced or "intercalated" by soaking the layered compound in a solution of n-butyllithium in hexane, as described by M. B. Dines in *Materials Research Bulletin*, Vol. 10, pages 287–291 (1975) and in U.S. Pat. No. 3,933,688, issued in 1976. Other methods of obtaining a layered compound with alkali metal between the layers are, for example, intercalation of the transition metal dichalcogenide with the alkali metal from solution in liquid ammonia as described by W. Rudorff in *Chimia*, Vol. 19, page 489 (1965), or by electrointercalation in an electrochemical cell as described by M. S. Whittingham in U.S. Pat. No. 4,009,052, issued 1977, or R. R. Haering, J. A. R. Stiles and K. Brandt in U.S. Pat. No. 4,224,390, issued 1980, or by exposing the layered compound to hot alkali metal vapors as mentioned on page 308 of *Intercalated Layered Materials*, edited by F. Levy (1979).

U.S. Pat. Nos. 4,299,892, Dines et al., November, 1981, and 4,323,480, Dines et al., April, 1982, are also of interest in this area.

SUMMARY OF THE INVENTION

A novel method of catalyst preparation which is different from present techniques, and which can produce extremely high active catalytic site densities, is disclosed. The method utilizes a powder of a layered transition metal dichalcogenide where the chalcogenide is a sulfide which contains an alkali metal between the layers (e.g. molybdenum disulfide which contains lithium).

The powder is rapidly mixed with water or other suitable hydrogen generating liquid, sometimes with $Al_2O_3$ suspended in it. The layered material exfoliates in the liquid. Vigorous agitation such as ultrasonication or high-speed stirring may assist in separating the layers. During exfoliation, a rapid reaction of the alkali metal (e.g. lithium) with water leads to hydrogen evolution between the planes of the disulfide. The crystallites (grains of the powder) are thereby "blown apart", that is, they "exfoliate" into "single layer" platelets comprised of one-layer units of the original metal dichalcogenide. The particles of exfoliated layered material and the particles of the support substance adhere together, provided that the pH of the solution is appropriately adjusted. Promoters can also be added at this point. The material is washed in water or other suitable liquid, and a dry powder is recovered. This powder, consisting of an exfoliated layered material on a support, is, with appropriate heat treatments for activation, the equivalent of a sulfided catalyst prepared by conventional means, but offers equal or better surface area per gram of disulfide using a procedure that is better understood and amenable to variations.

The invention is directed to a process of preparing a substance of the form:

$MS_2:Z$ wherein $MS_2$ is a single layer of a transition metal disulfide (M being the transition metal and S being sulfur) selected from the group consisting of $MoS_2$, $TaS_2$, $WS_2$; and Z is a suitable support substance interspersed in the layers of $MS_2$, which comprises: (a) introducing an alkali metal into $MS_2$ in multilayer form in a dry environment such that the alkali metal is substantially intercalated between the layers of the $MS_2$; (b) immersing the intercalated $MS_2$ in a reducible hydrogen generating solution to thereby cause the layers of $MS_2$ to separate; and (c) depositing the exfoliated layers of $MS_2$ on the support substance Z.

We also disclose a process of preparing a substance of the form $MS_2:Y:Z$ wherein $MS_2$ is a single layer transition metal layered dichalcogenide such as $MoS_2$, $TaS_2$, $WS_2$; Y is a promoter substance; and Z is a support substance; which comprises: (a) intercalating the $MS_2$ in multi-layer form with an alkali metal in a dry environment such that the alkali metal is substantially intercalated between the layers of the $MS_2$; (b) immersing the intercalated $MS_2$ in a reducible hydrogen generating solution to thereby cause the layers of $MS_2$ to separate; and (c) mixing the support substance and the promoter material in a first solution; (d) subsequently mixing the first and second solutions so as to simultaneously flocculate the $MS_2$, promoter material and support solution to form the $MS_2:Y:Z$ compound.

We also disclose a process where the support material Z is introduced by precipitation or adsorption from solution using a technique similar to the inclusion of Y above, which comprises: (a) intercalating the $MS_2$ in multi-layer form with an alkali metal in a dry environment such that the alkali metal is substantially intercalated between the layers of the $MS_2$; (b) immersing the intercalated $MS_2$ in a reducible hydrogen generating solution to thereby cause the layers of $MS_2$ to separate; (c) mixing soluble salts of the support material and (if desired) the promoter material in separate solutions; and (d) subsequently mixing the three solutions to flocculate the disulfide single layers, the support material and (if desired) the promoter material.

In all cases above, if the starting material is a transition metal dichalcogenide which already contains an alkali metal, step (a) in the processes described is omitted. In all cases above, the solids are separated from the supernatant liquids, dried, and activated by suitable high temperature treatments.

DRAWINGS

In the drawings

DETAILED DESCRIPTION OF SPECIFIC EMBODIMENTS OF THE INVENTION

Figure 1:
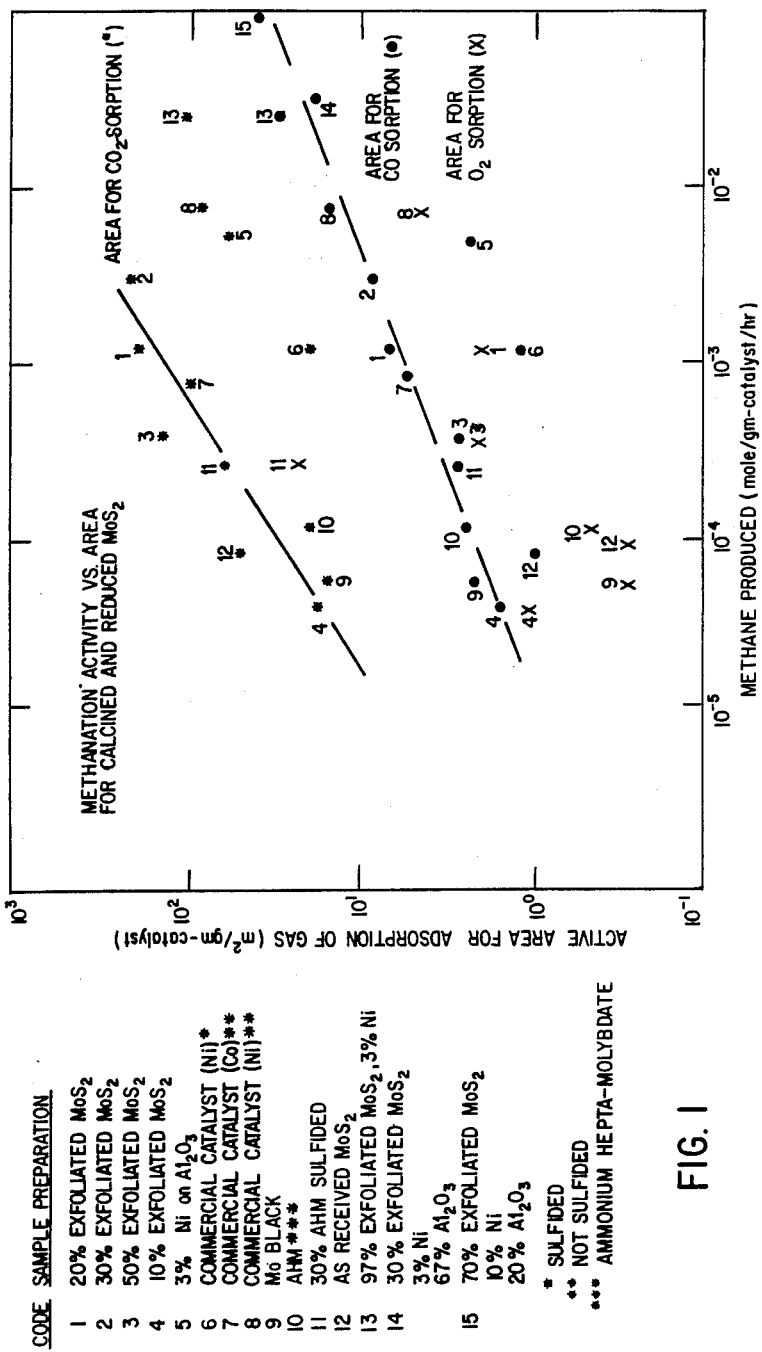
FIG. 1 illustrates a chart of temperature programmed desorption (TPD) of various catalyst species vs. catalytic activity of the catalyst in methanation.

We have developed a new form of single layer transition metal dichalcogenide, particularly, molybdenum disulfide, $MoS_2$, in the form of single molecular layers suspended in aqueous solution. We have been able to deposit these single layers onto aluminum oxide ($Al_2O_3$) in several ways. Using semi-empirical techniques and ideas based on models of what should be useful configurations, we have been able to prepare catalysts for the hydrogenation of CO (methanation catalysts) which are three to ten times more active than catalysts prepared by classical precipitation techniques. Our invention has similar application to hydrodesulfurization catalysts and catalysts for hydrogenation of heavy oils, etc.

In the important application of $MoS_2$ as a hydrodesulfurization catalyst for the oil and coal industries, it has been suggested in the literature that the active sites for hydrodesulfurization are associated with single layers of molybdenum disulfide on alumina with cobalt atoms closely associated with each site. With our new form of molybdenum disulfide, prepared initially as single layers, it is possible to make a highly concentrated, homogeneous array of such active sites. The concentration of active sites per gram of catalyst is much greater than is possible by the "accidental" generation of such sites during the classical precipitation methods of catalyst preparation now followed.

Exfoliated $MoS_2$ has been deposited on alumina particles in aqueous suspension, enabling recovery of dry exfoliated $MoS_2$ supported on the alumina. With no surfactant, it was found by experimentation that if exfoliation took place in water in the presence of a sufficient quantity of alumina powder, or if sufficient alumina powder was introduced following exfoliation, the suspension would clear in a few minutes, thereby implying deposition of the flakes of $MoS_2$ onto the alumina under conditions when the $MoS_2$ would not adhere to itself (flocculate). Deposition on alumina thus provides a method of removing the exfoliated $MoS_2$ from suspension without re-stacking by flocculation. Such "supported" samples were washed to remove lithium hydroxide, then dried.

The amount of alumina (1 micron diameter powder) necessary to clear a suspension of exfoliated $MoS_2$ was such that the total area of the alumina was approximately matched to half the total area of the $MoS_2$ (as calculated knowing the mass of $MoS_2$ and assuming single-layer dispersion). The suspension did not clear if insufficient alumina was present, indicating that the alumina particles became covered with monolayers of $MoS_2$, and additional $MoS_2$ particles remained in suspension without adhering to the $MoS_2$ coated alumina, or to other $MoS_2$ particles. Deposition of multilayers, if desired, was achieved at this point in the process by lowering the pH to below 3 to cause flocculation. Numerous samples of alumina-supported $MoS_2$ were prepared and varying amounts of coverage were achieved using $MoS_2$ monolayers and multilayers. Typical proportions of $MoS_2$ to alumina were in the range 0.5% to 10% $MoS_2$ by mass.

As an initial step in the preparation of our supported single-layer transition metal dichalcogenides, and as a specific example, we have developed a new form of exfoliated $MoS_2$. In using the expression, "exfoliated $MoS_2$", we mean $MoS_2$ suspended in aqueous solution in the form of single molecular layers, ready to process in various configurations, including those most suitable for a supported catalyst.

In the preparation of exfoliated $MoS_2$, there are several steps to perform. First, a commercial fine $MoS_2$ powder (typically 1 micron size) is intercalated with lithium. In this step, the $MoS_2$ powder is suspended in a solution of n-butyllithium in hexane, in an inert atmosphere (e.g., argon) in a dry box. After soaking for a few hours to a day in this solution, the lithium has penetrated between the layers of the layer compound $MoS_2$, that is, the lithium has "intercalated". The intercalated $MoS_2$:Li is removed from the dry box while still protected from air and from moisture and is then immersed in an aqueous solution. The intercalated lithium reacts with the water and generates hydrogen. The generated hydrogen gas pushes the layers of the $MoS_2$ apart such that the powder essentially is "blown apart" by the hydrogen. Vigorous agitation such as by ultrasonication or high-speed stirring may assist in separating the layers. If the pH is maintained at a value above about 3 the suspension will not flocculate but will stay for days or more suspended in water.

The next step is to process the exfoliated $MoS_2$, and several techniques have been developed. The exact optimum procedures depend on the application of interest in each case. For example, if the objective is to prepare a catalyst, then at this point the required catalytic promoter can be added to the molybdenum disulfide.

We have made extensive studies of the adsorption of various hydroxylated cations on the surface of the exfoliated $MoS_2$ including the important promoters cobalt (Co) and nickel (Ni) that are used in hydrodesulfurization catalysis. If we adjust the pH correctly, we can induce adsorption of the cobalt or the nickel in the form of a partial monolayer on the surface of the molybdenum disulfide single layers, an arrangement that should be close to ideal for catalytic activity. The fact that the cobalt and nickel, presumably in the form of hydroxides, are adsorbed as a partial monolayer is simply demonstrated by restacking the $MoS_2$ with the monolayer still adsorbed (this is done simply by centrifuging out the material and drying) upon which it is determined by X-ray diffraction that the spacing between the layers has decreased by 8 to 10 percent. We have termed such structures "inclusion compounds". The cobalt or the nickel monolayer acts to bind the $MoS_2$ layers more tightly than they would be bound with just the normal van der Waals attraction of the crystal.

Alternatively, if the solution reaches a pH at which precipitation of the hydroxide normally occurs, we can deposit clusters of $Co(OH)_2$ or $Ni(OH)_2$ on the $MoS_2$ layers. It has been found that the inclusion of some heavy atoms or precipitate particles increases the surface area of the $MoS_2$ substantially. This is attributed to the separation of the layers (sometimes observed by X-ray diffraction) allowing gases (in particular, nitrogen gas for the BET measurements) to penetrate and measure the entire surface area of the MoS plus clusters.

The included material can alternatively be aluminum hydroxide introduced as aluminum nitrate, with the flocculation of $MoS_2$ onto monolayers of aluminum hydroxide or clusters of aluminum hydroxide. In such a case, the aluminum compounds so introduced can be used as the "support".

Figure 2:
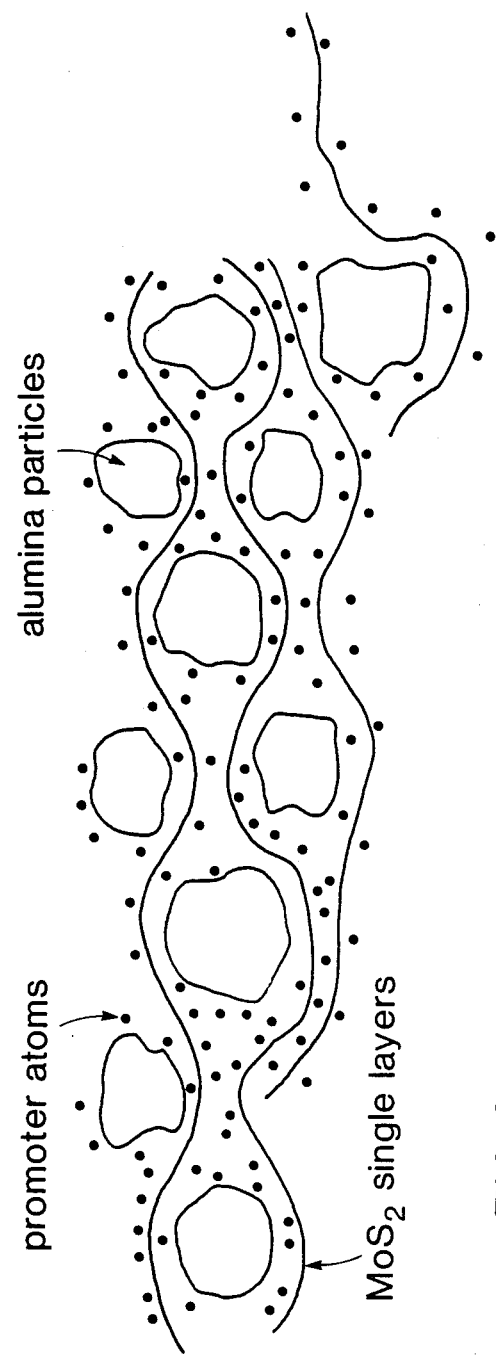
FIG. 2 illustrates the cross-sectional configuration of a flocculated molybdenum disulfide-alumina-promoter structure.

In the preparation of this new $MoS_2$ form as a catalyst, the $MoS_2$ is interspersed with alumina that is suspended in the solution or added to the solution. We have discovered that in an intermediate pH region, that is a region where neither the $MoS_2$ nor the $Al_2O_3$ alone will flocculate, a mixture of $MoS_2$ and $Al_2O_3$ will flocculate. This is entirely unexpected. We have concluded that the $MoS_2$ adsorbs on the alumina as a single layer, or (with fine $Al_2O_3$ of particle size less than the diameter of the $MoS_2$ layers) the $Al_2O_3$ deposits on the monolayers of $MoS_2$, forming aggregates as indicated by FIG. 2. There are two pieces of evidence for this conclusion. First, because the $MoS_2$ will not adhere to itself (will not flocculate), then when the alumina becomes covered by a single layer of $MoS_2$ a second layer of $MoS_2$ is not expected to deposit on the first. When another particle of alumina deposits on the flocculate, then another layer of $MoS_2$ can deposit. Second, the suspension clears (everything settles out) with one micron alumina particles when the $MoS_2$ percentage by weight is less than 2%, but the suspension does not clear if the $MoS_2$ percentage by weight is greater than 5%. This percentage is essentially the amount of $MoS_2$ necessary to form a monolayer on the alumina particles, and confirms the fact that if there is too much $MoS_2$ to form a monolayer (greater than a few percent) the excess $MoS_2$ stays in suspension.

This ability to form monolayers of $MoS_2$ on alumina (or monolayers of $MoS_2$ separated by fine alumina particles) is considered extremely important in the preparation of catalysts, both because (as discussed below) we have made exceptionally active catalysts using monolayers on $Al_2O_3$ or NiO, or both, and because models of hydrodesulfurization catalysis suggest monolayer $MoS_2$ is exceptionally active.

Preparation of Catalyst

We have studied the preparation of the new catalyst to optimize the hydrogenation of CO (the methanation reaction). Using the techniques described above, we have studied the reactivity of $MoS_2$ without alumina and as single layers on alumina and in many intermediate forms. We have introduced promoters in the form of inclusion compounds.

We have compared the catalytic activity for methanation using exfoliated $MoS_2$ with various formulations including flocculated $MoS_2$, precipitated (from ammonium heptamolybdate) $MoS_2$, precipitated or adsorbed nickel, or combinations of flocculated or precipitated $MoS_2$ and nickel on alumina. FIG. 1 shows results that summarize many of the measurements. FIG. 1 represents a plot of the active surface area determined from temperature programmed desorption (TPD) of various species from the catalyst vs. the catalytic activity of the catalyst in methanation. The type of preparation for each of the points is indicated on the curve. The most important result of FIG. 1 from the point of view of the present disclosure is the fact that the catalytic activity changes dramatically with the various forms of preparation and the catalytic activity can be compared for these various forms of preparation.

As a basic reference point, the catalytic activity for various formulations without nickel present as a promoter can be seen in FIG. 1. From this we can compare the best exfoliated $MoS_2$ sample (supported on alumina) which is Sample #2, where 30% $MoS_2$ is exfoliated on 500 Å $Al_2O_3$. Sample #2 can be compared to Samples #10 or #11, where the 30% molybdenum disulfide is prepared by precipitation from ammonium heptamolybdate, Sample #10 giving the catalytic activity in the oxide form, Sample #11 the catalytic activity in sulfided form. A factor of ten improvement in catalytic activity for the catalyst based on exfoliated $MoS_2$ can be observed.

Further, we can compare the activity of catalysts that include nickel. For example, Sample #8, which is a commercial catalyst with nickel and $MoO_3$ supported on alumina to give a high activity in hydrogenation catalysis, can be compared to Samples #13 or #14 using the exfoliated $MoS_2$ with nickel. Again, we find a factor of five or more increase in catalytic activity for the catalysts based on exfoliated MoS2. In this case it may be due to an improvement in the dispersion of the nickel.

It is clear from the foregoing results that by using exfoliated $MoS_2$ as the starting material and suitably preparing the catalyst one can obtain a superior catalyst over that prepared by the standard precipitated $MoS_2$ from ammonium heptamolybdate, both in the case of promoted and non- promoted catalysts. We fully expect that novel superior catalysts for hydrodesulfurization can be prepared using similar techniques.

From the literature on hydrodesulfurization catalysts, the claim is that monolayer deposits of $MoS_2$ on alumina with a promoter present provide the most active sites. Of course, with the normal way of preparing the catalysts (co-precipitation of Mo and the promoter), there is little control over such sites, for the materials deposit as crystallites. Chemists have concluded that where there happens to be a single atom of Mo on the Al of the $Al_2O_3$, the site is specially active. With our process of exfoliation and flocculation in the form of single $MoS_2$ layers, we have developed the ability in principle to make every site on the $Al_2O_3$ a "single atom" site. To obtain the greatest number of such sites, one ants ultrafine alumina (the alumina we have used for our experiments is of the order of 300Å to 500Å diameter). We concluded that the optimum configuration of the material after flocculation should be the form shown in FIG. 2. To achieve this form, we have combined two processes such that they will occur simultaneously, namely, adsorption of the promoter (nickel from the nitrate, depositing as $Ni(OH)_2$), and deposition of the fine alumina particles on the single layers of $MoS_2$ Either of these processes could cause flocculation if the pH level is correctly adjusted. The requirement is that both occur simultaneously and the whole mass flocculate together.

We have found by experiment that at pH 6.2, a mixture of the $MoS_2$ and the alumina will flocculate, although neither will settle out by itself. The alumina particles bind the $MoS_2$ layers together until the mass reaches a few thousand angstroms in diameter and is large enough to flocculate. Also at pH 6.2, the mixture of Ni(NO$_3$)$_2$ and MoS$_2$ will flocculate; again it is presumed that the monolayer of Ni(OH)$_2$ binds the MoS$_2$ single layers together. At this particular pH, both flocculations occur at about the same rate, which is desirable in order to achieve the configuration shown in FIG. 2.

To induce "simultaneous flocculation", we have prepared the alumina suspension in a nickel nitrate solution and have carefully adjusted the pH to 6.2. In a separate container, we have exfoliated the MoS2, and adjusted its pH to 6.2. The two suspensions were then mixed and flocculation followed.

Figure 3:
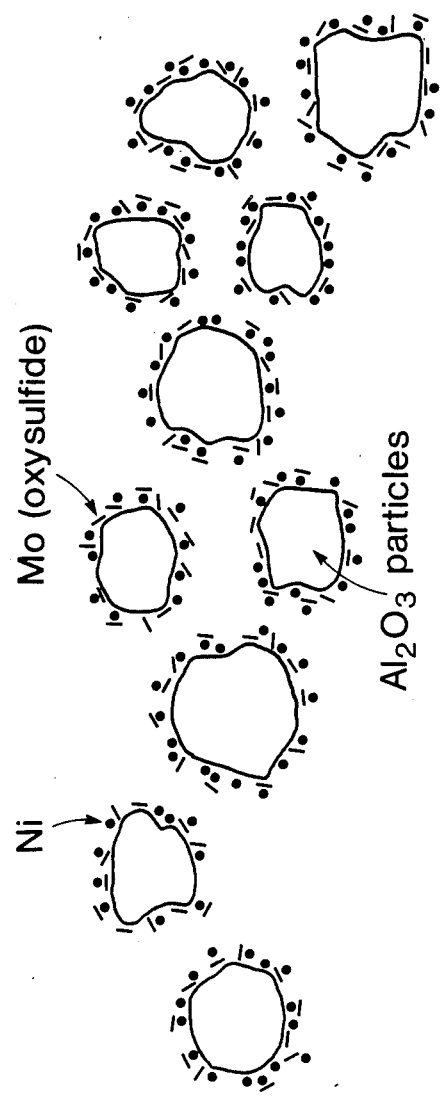
FIG. 3 illustrates the cross-sectional configuration of a dried, calcined molybdenum (oxysulfide)-nickel, alumina structure.

After flocculation, the sample was dried and calcined at 500° C. (heated in oxygen), a process that converts much of the sulfide to an oxide. We believe this leads to a much stronger interaction between the Al, the Mo, and the Ni. We believe the configuration is that shown in FIG. 3, especially after a final hydrogen treatment at 550° C. The configuration shown in FIG. 3 gives complete coverage on the Al$_2$O$_3$ of the favoured Al/Mo/Ni sites and at the same time breaks up the MoS$_2$ layers so that there is rapid access for the gases to be reacted (in the present case CO and H$_2$ to make CH$_4$).

Experimentally, we have found that our procedure provides five to ten times the catalytic activity of any of the other treatments tested at temperatures between 300° to 400° C., as indicated in FIG. 1. The samples under discussion are those marked #15 in FIG. 1. Examples of experimental procedure and the resulting improvements are discussed below.

EXAMPLE 1

MoS$_2$ Single Layers Deposited on Alumina

We have found that adding 0.3 g gamma-Al$_2$O$_3$ from Cabot Corporation (Alon gamma-alumina) of 300–500 Å diameter to 100 ml H$_2$O yields a suspension that is acidic with a pH of about 3.9. The pH of this suspension was raised to pH 6.4 by adding droplets of a 0.1 molar solution of NaOH and stirring well. The pH was maintained well below pH 9 to avoid rapid flocculation. Intercalated MoS$_2$ with Li, MoS$_2$:Li, was formed by adding 1 g MoS$_2$ powder to 50 ml of 2.5 molar solution n-butyllithium dissolved in hexane, the procedure being performed in an argon atmosphere (in a dry box). After soaking for two days, the supernatant hexane was poured off, the vial of MoS$_2$:Li was washed twice with hexane, and the vial was stoppered. The powder, removed from the dry box, stoppered to preclude attack by air or water vapour, was inserted in 100 ml H$_2$O, resulting in copious gas evolution and resulting in exfoliation of the MoS$_2$ into a single-layer suspension of MoS$_2$ (as determined by X-rays, P. Joensen, R. F. Frindt and S. R. Morrison, Mat. Res. Bull. 21 457 (1986)) in a solution of LiOH at a pH of the order of 12. The pH of the suspension was lowered to 6.4 by adding dilute HNO$_3$ as required. This suspension was then mixed with the suspension of Al$_2$O$_3$.

The procedure for mixing the two suspensions was as follows. About 50 ml of deionized water in a container was stirred with a magnetic stirrer. The two 100 ml suspensions prepared as above at pH 6.4 in two different containers were simultaneously poured into the stirred H$_2$O. After a few minutes, when the liquids were well mixed, the stirring was stopped. Within one to two minutes, the solution began to clear, an indication of the completeness of the attraction between the MoS$_2$ and the alumina and the beginning of flocculation. In about five to ten minutes, the whole mixture totally flocculated. The clear supernatant solution was then removed and the flocculated precipitate was recovered and washed twice in deionized water. The sample was dried at 60° C. in air, then inserted into an apparatus designed to measure the catalytic activity, calcined at 500° C. and reduced in forming gas at 550° C. The sample was then tested for catalytic activity, with the result indicated in FIG. 1, Sample #1.

EXAMPLE 2

MoS$_2$ with Included Nickel (No Alumina)

As a second example, we describe the preparation of Sample #13 of FIG. 1. A 10 ml 0.1 molar solution of Ni(NO$_3$)$_2$. 6H$_2$O (29 g/l) was prepared. The solution was acidic with a pH of 4.2. This pH was raised to 6.2 by adding a 0.1 molar solution of NaOH. At a pH of 6.6, the solution was found to become cloudy and a further increase in pH caused the Ni(OH)$_2$ to precipitate. Because we wanted a solution, not a suspension, we stopped at a pH of 6.2±2 percent. 1 g MoS$_2$ as a suspension of single layers in 100 ml H$_2$O, prepared as in Example 1, with an adjusted pH of 6.2, was mixed with the above nickel solution in the same manner as described in Example 1. The suspension cleared and the Ni-included MoS$_2$ precipitate was recovered and washed twice with deionized water. The presence of the nickel was confirmed by an electron microprobe measurement. As in Example 1, the material was calcined at 500° C. in air, reduced at 550° C. in H$_2$, and tested for catalytic activity with the results given in FIG. 1, Sample #13.

EXAMPLE 3

Promoter Ni Included with MoS$_2$ Single Layers on Alumina

This method was used to prepare the highly active Sample #15 of FIG. 1. A hydroxylated nickel solution (30 ml) was prepared as in Example 2 with a pH of 6.2. The pH of the alumina suspension (0.3 g in 100 ml), prepared as in Example 1, was adjusted to 6.2. The two liquids were mixed. A suspension of single layer MoS$_2$ (1 g in 100 ml) was prepared as in Example 1. The Al$_2$O$_3$/Ni suspension and the MoS$_2$ suspension were then mixed as described in Example 1 and the solution cleared in about five minutes. The sample was dried, calcined, and reduced as in Example 1. The sample was tested for catalytic activity with the results shown for Sample #15 of FIG. 1.

EXAMPLE 4

Precipitated Alumina on Single-Layer MoS$_2$ 100 ml of 0.1 molar Al(NO$_3$)$_3$.9H$_2$O was prepared (3.75 g aluminum nitrate in 100 ml H$_2$O). The solution was acidic with a pH value of 3.1. The pH was raised slowly with a 0.5 molar NaOH solution at a rate of one drop per hour while stirring thoroughly with a magnetic stirrer. After several days at a pH value of about 4.8, we found that the Al(OH)$_3$ precipitated, so to prevent this, the pH was allowed to rise only to 4.4±2 percent. It was then mixed with the MoS$_2$ single layer suspension (1 g in 100 ml) as described in Example 2, but with the pH of the MoS$_2$ only lowered to a pH of 8.5. The pH of the mixture remained at 4.4. The mixture flocculated in ten to twenty hours. The precipitates were washed, dried and further processed. In this case, the calcining step was omitted. The sample was exposed to forming gas at 530° C. Two samples were made, one with an Al:Mo ratio of 0.7 (as measured by electron microprobe) and one with an Al:Mo ratio of 1.1. In the former case, the TPD of CO was enhanced by a factor of 10 over Sample #4 in FIG. 1, and in the latter case, the TPD of $O_2$ was enhanced by a factor of 30 over Sample #4 in FIG. 1. Thus the samples provided large adsorption of the gases of interest in catalysis. With the sample where the CO adsorption was enhanced, the catalytic activity for methanation was increased a factor of 100 over that of Sample #4, FIG. 1, where the $MoS_2/Al_2O_3$ (atomic percent) is the same.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A process for preparing a substance of the form:

$$MS_2:Z$$

wherein $MS_2$ is a layer of a transition metal dichalcogenide selected from the group consisting of $MoS_2$, $TaS_2$ and $WS_2$; Z is a support substance selected from the oxides or hydrous oxides of Al, Sn or Ti, which comprises:
   (a) immersing multi-layered $MS_2$ containing an alkali metal, with an alkali metal to M atomic ration of about 1, in liquid water to thereby cause the layers of $MS_2$ to exfoliate;
   (b) adhering the exfoliated layers of $MS_2$ with the support substance Z in the water to generate a solid; and
   (c) separating generated solid from the water.

2. A process as defined in claim 1 wherein the solid is activated by thermal treatment.

3. A process as defined in claim 1 wherein the support substance is alumina ($Al_2O_3$) in the form of powder particles.

4. A process as defined in claim 3 wherein the $MS_2$ is molybdenum disulfide ($MoS_2$).

5. A process as defined in claim 3 wherein the $MS_2$ is molybdenum disulfide ($MoS_2$) in the form of powder particles.

6. A process as defined in claim 5 wherein the alkali metal is lithium.

7. A process as defined in claim 3 wherein the alumina is present in the water when the layers of $MoS_2$ are exfoliated according to step (a).

8. A process as defined in claim 7 wherein the diameter of the alumina powder particles is between about 1 micron to about 0.1 micron.

9. A process as defined in claim 5 wherein the diameter of the alumina powder particles is in the range 0.03 microns to 0.1 microns, and is less than the diameter of the $MoS_2$ powder particles.

10. A process as defined in claim 9 wherein the $MoS_2$ powder particles are of a diameter between 0.1 and 10 micron.

11. A process as defined in claim 10 wherein the pH of the aqueous solution is lowered to less than about 3 to thereby cause the exfoliated $MoS_2$ to adhere to the alumina powder in more than one layer.

12. A process as defined in claim 4 wherein the alumina powder is added to the water after the $MoS_2$ has been exfoliated.

13. A process as defined in claim 1 further comprising activating the separated solid by reducing by exposure to hydrogen.

14. A process of preparing a substance of the form:

$$MS_2:Y:Z$$

wherein $MS_2$ is a single layer of a transition metal dichalcogenide selected from the group consisting of $MoS_2$, $TaS_2$ and $WS_2$; Y is a promoter substance selected from the group consisting of an oxide, a hydroxide or a sulfide of an element from Groups IB, VB, VIB, VIIB and VIIIB of the Periodic Table; and Z is a support substance selected from the group consisting of oxides or hydrous oxides of Al, Sn or Ti, interspersed between layers of $MS_2$, which comprises:
   (a) immersing multi-layered $MS_2$ containing an alkali metal in liquid water to thereby cause the layers of $MS_2$ to separate into a signal-layer suspension;
   (b) mixing together support substance Z and a solution of a soluble salt of an element selected from the group consisting of Group IB, VB, VIB, VIIB and VIIIB of the Periodic Table;
   (c) subsequently mixing the single-layer suspension of $MS_2$ with the solution containing the mixed support material Z and the soluble salt so as to simultaneously flocculate the $MS_2$, promoter substance Y, which precipitates from the solution containing the soluble salt, and support substance Z to form the flocculated solid $MS_2:Y:Z$ and
   (d) separating the flocculated solid from the liquid.

15. A process as defined in claim 14 wherein the solid is activated by thermal treatment.

16. A process as defined in claim 14 wherein the solid is activated by exposure to hydrogen to optimize the catalytic activity of the solid.

17. A process as defined in claim 14 wherein the multi-layered $MS_2$ is $MoS_2$.

18. A process as defined in claim 17 wherein the promoter substance Y is a soluble nickel salt, which during flocculation converts to nickel hydroxide.

19. A process as defined in claim 18 wherein the support substance Z is alumina.

20. A process as defined in claim 19 wherein the alkali metal is lithium.

21. A process as defined in claim 19 wherein the pH of the single-layer suspension of $MoS_2$ and the solution containing the $Al_2O_3$ and the nickel salt is adjusted to about 6.2 to promote simultaneous flocculation.

22. A process as defined in claim 21 wherein the flocculated $MoS_2:Ni(OH)_2:Al_2O_3$ is dried and calcined at about 500° C. to produce calcined $MoS_2:Ni(OH)_2:Al_2O_3$.

23. A process as defined in claim 22 wherein the calcined $MoS_2:Ni(OH)_2:Al_2O_3$ is reduced at 500° C. in hydrogen.

24. A process of preparing a substance of the form:

$$MS_2:QX$$

wherein $MS_2$ is a single layer of transition metal dichalcogenide selected from the group consisting of $MoS_2$, $taS_2$ and $WS_2$; and QX is a support compound wherein Q is selected from the group consisting of Al, Ti, Si, Zn and Sn cation and QX represents an oxide or hydrous oxide of Q, which comprises:
   (a) immersing multi-layered $MS_2$ containing an alkali metal, with an alkali metal to M atomic ration of about 1, into liquid water to thereby cause the layers of $MS_2$ to exfoliate in suspension;
(b) dissolving a liquid soluble salt of Q to form a liquid solution with a pH adjusted to be immediately below the precipitation point of the hydroxide of Q;
(c) mixing the suspension of $MS_2$ with the solution of soluble salt of Q to thereby cause the flocculation of $MS_2$ with QX included; and
(d) separating flocculated QX includes $MS_2$ from the mixture.

25. A process as defined in claim 24 wherein the solid is activated by thermal treatment.

26. A process as defined in claim 24 wherein the solid is activated by exposure to hydrogen to optimize the catalytic activity of the solid.

27. A process as defined in claim 24 wherein the multi-layered $MS_2$ is $MoS_2$ powder.

28. A process as defined in claim 24 wherein Q is an aluminum cation.

29. A process as defined in claim 24 wherein the intercalated alkali metal is lithium.

30. A process as defined in claim 24 wherein the soluble salt of Q is present in the liquid water so that the $MS_2$ is exfoliated in the presence of the soluble salt of Q.

31. A process as defined in claim 27 wherein the Q is an aluminum cation.

32. A process of preparing a substance of the form:

$MS_2:Y:QX$ wherein $MS_2$ is a single layer of a transition metal dichalcogenide selected from the group consisting of $MoS_2$, $TaS_2$ and $WS_2$ :QX is a support compound where Q is selected from the group consisting of Al, Ti, Si Zn and Sn cation; QX represents an oxide or hydrous oxide of Q; and Y is a promoter substance selected from the group consisting of an oxide, a hydroxide, or a sulfide of an element from Groups IB, VB, VIIB and VIIIB of the Periodic Table, which comprises:
(a) immersing multi-layered $MS_2$ containing alkali metal with an alkali to M ratio of about 1, in liquid water to thereby cause the layers of $MS_2$ to separate into a single-layer suspension in this first solution;
(b) dissolving a soluble salt of Q to form a second solution with a pH that is adjusted to be immediately below the precipitation point of the hydroxide of Q;
(c) dissolving a soluble salt of an element selected from the group consisting of Groups IB, VIB, VIIB and VIIIB of the Periodic Table in a liquid to form a third separate solution;
(d) mixing the three solutions from (a), (b) and (c) together to cause the solid flocculation of $MS_2$ with Y and X includes, where Y and QX precipitate from solution; and
(e) separating the flocculated solid from the mixed solutions.

33. A process as defined in claim 32 wherein the solid is activated by thermal treatment.

34. A process as defined in claim 32 wherein the solid is activated by exposure to hydrogen to optimize the catalytic activity of the solid.

35. A process as defined in claim 32 wherein the multi-layered $MS_2$ is $MoS_2$ powder.

36. A process as defined in claim 32 wherein Q is an aluminum cation.

37. A process as defined in claim 35 wherein the alkali metal is lithium.

38. A process as defined in claim 37 wherein Y is a compound of nickel.

39. A process as defined in claim 38 wherein the support compound QX is an oxide or hydrous oxide of aluminum.

40. A process as defined in claim 14, 24, or 32 further comprising activating the separated solid by calcining.

41. A process as defined in claim 1, 14, 24 or 32 further comprising activating the separated solid by sulfiding.

42. A process as defined in claim 14 or 32 wherein promoter substance Y is a hydroxide of an element selected from Groups IB, VB, VIB, VIIB and VIIIB of the Periodic Table and deposits as the hydroxide.

* * * * *